(12) United States Patent
Costinel

(10) Patent No.: US 8,147,677 B2
(45) Date of Patent: Apr. 3, 2012

(54) METHOD AND APPARATUS FOR INTRODUCING FLUIDS INTO A HYDROCRACKING REACTOR

(75) Inventor: Paul Costinel, Sherwood Park (CA)

(73) Assignee: Genoil Inc., Sherwood Park (CA)

( * ) Notice: Subject to any disclaimer, the term of this patent is extended or adjusted under 35 U.S.C. 154(b) by 636 days.

(21) Appl. No.: 12/388,363

(22) Filed: Feb. 18, 2009

(65) Prior Publication Data

US 2009/0152166 A1     Jun. 18, 2009

Related U.S. Application Data

(62) Division of application No. 11/312,578, filed on Dec. 21, 2005, now Pat. No. 7,510,689.

(51) Int. Cl.
*C10G 47/00* (2006.01)
(52) U.S. Cl. ........................................ 208/107; 208/108
(58) Field of Classification Search ........................ None
See application file for complete search history.

(56) References Cited

U.S. PATENT DOCUMENTS

| | | | |
|---|---|---|---|
| 2,543,617 A | 2/1951 | Wiant | |
| 3,152,981 A | 10/1964 | Berlin et al. | |
| 4,440,629 A * | 4/1984 | Stine | 208/111.15 |
| 4,995,961 A | 2/1991 | Hays et al. | |
| 5,289,976 A * | 3/1994 | Dou et al. | 239/431 |
| 5,306,418 A * | 4/1994 | Dou et al. | 208/157 |
| 5,948,241 A * | 9/1999 | Owen | 208/113 |
| 6,257,504 B1 * | 7/2001 | Owen | 239/432 |
| 6,346,219 B1 | 2/2002 | Hedrick | |
| 2009/0206006 A1 * | 8/2009 | Allam | 208/107 |

* cited by examiner

*Primary Examiner* — Tam M Nguyen
(74) *Attorney, Agent, or Firm* — Oyen Wiggs Green & Mutala LLP

(57) ABSTRACT

The invention provides a method and apparatus for introducing a high-density hydrocarbon liquid into a hydrocracking reactor. The method comprises atomizing the high-density hydrocarbon liquid and injecting the atomized liquid into the hydrocracking reactor. The method may also comprise mixing hydrogen with the high-density hydrocarbon liquid prior to atomizing the high-density hydrocarbon liquid. The apparatus comprises an injection valve for introducing a high-density hydrocarbon liquid into a hydrocracking reactor comprises an atomizer coupled to receive the high-density hydrocarbon liquid. The atomizer comprises a nozzle configured to atomize the high-density hydrocarbon liquid and inject the high-density hydrocarbon liquid into the hydrocracking reactor. The injection valve may also comprise a mixer coupled to receive hydrogen and the high-density hydrocarbon liquid. The mixer may be configured to mix the hydrogen and high-density hydrocarbon liquid and deliver the mixture to the atomizer.

4 Claims, 8 Drawing Sheets

METHOD AND APPARATUS FOR INTRODUCING FLUIDS INTO A HYDROCRACKING REACTOR

REFERENCE TO RELATED APPLICATION

This application is a divisional of U.S. patent application Ser. No. 11/312,578 filed on 21 Dec. 2005, now U.S. Pat. No. 7,510,689.

TECHNICAL FIELD

This invention relates to methods and apparatus for introducing fluids into reactors for upgrading hydrocarbons. Certain embodiments of the invention have particular application to introducing hydrogen and high-density hydrocarbons into upgrader reactors such as hydrocracking reactors.

BACKGROUND

High-density hydrocarbons such as heavy oil may be upgraded through hydrocracking by mixing the oil with hydrogen in the presence of a catalyst under high pressure and temperature in a hydrocracking reactor. The effectiveness of hydrocracking depends in part on the ability of hydrogen to interact with hydrocarbons. In order to crack long molecular chains of heavy oils, hydrogen needs to reach as many hydrocarbon molecules as possible. Effective admixture of hydrogen in the mass of hydrocarbon is therefore desirable.

Various arrangements have been devised to inject hydrogen into hydrocarbons upstream of or within a reactor. U.S. Pat. No. 3,152,981 discloses a process of forming a mixture of hydrogen and hydrocarbons wherein a distillate feed is introduced into the reactor through a line. The inventor has determined that this process has limited effectiveness, since the distillate feed is not broken down into minute particles. This limits the surface area available for contacting and hydrogen-hydrocarbon interaction. Furthermore, in the absence of bulk liquid disintegration, heat transfer to the hydrocarbons is minimal and light-weight fractions in the hydrocarbon spray remain in a liquid phase and absorb hydrogen unnecessarily, thereby reducing the hydrogen available to be absorbed by heavier fractions.

U.S. Pat. No. 4,995,961 describes injection of hydrogen into a stream of oil through spargers designed to mix the two fluids within the reactor. However, the inventor has determined that the relatively large size of hydrogen bubbles limits both hydrogen dispersion and contact area between the fluids.

The present invention provides methods and apparatus for upgrading hydrocarbons that avoid some disadvantages of current hydrocracking systems.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method for introducing a high-density hydrocarbon liquid into a reactor for upgrading hydrocarbons such as a hydrocracking reactor. The method comprises atomizing the high-density hydrocarbon liquid and injecting the atomized liquid into the hydrocracking reactor. The method may comprise mixing hydrogen with the high-density hydrocarbon liquid prior to atomizing the high-density hydrocarbon liquid.

Another aspect of the invention provides an injection valve for introducing a high-density hydrocarbon liquid into a hydrocracking reactor. The injection valve comprises an atomizer coupled to receive the high-density hydrocarbon liquid. The atomizer comprises a nozzle configured to atomize the high-density hydrocarbon liquid and inject the high-density hydrocarbon liquid into the hydrocracking reactor. The injection valve may also comprise a mixer coupled to receive hydrogen and the high-density hydrocarbon liquid. The mixer may be configured to mix the hydrogen and the high-density hydrocarbon liquid and deliver a mixture of hydrogen and high-density hydrocarbon to the atomizer.

In addition to the exemplary aspects and embodiments described above, further aspects and embodiments are shown in the drawings and described in the following detailed descriptions.

BRIEF DESCRIPTION OF DRAWINGS

Exemplary embodiments are illustrated in referenced figures of the drawings. The embodiments and Figures disclosed herein are illustrative rather than restrictive.

In drawings which illustrate non-limiting embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

The invention provides a method for introducing hydrocarbons into an upgrader reactor such as a hydrocracking reactor. The hydrocarbons may comprise, for example, high-density hydrocarbons such as heavy oil or the like. The method involves atomizing the hydrocarbons and injecting them into the reactor. The hydrocarbons may be mixed with hydrogen prior to atomization. Mixing of hydrogen and hydrocarbons may be accomplished, for example, by passing the hydrogen and hydrocarbons through one or more swirl devices in an injection valve. The method may also include regulating the pressure in the reactor at least in part by controlling the rate at which the hydrocarbons are introduced into the reactor.

The invention also provides an apparatus for introducing hydrocarbons into an upgrader reactor such as a hydrocracking reactor. The apparatus comprises an atomizer having a nozzle in fluid communication with the reactor for atomizing high-density hydrocarbons. The apparatus may also comprise a mixer for mixing the high-density hydrocarbons with hydrogen prior to atomization. The mixer may comprise one or more swirl devices. A pressure regulator may also be provided to control the rate at which the hydrocarbons are introduced into the reactor.

Figure 1A:
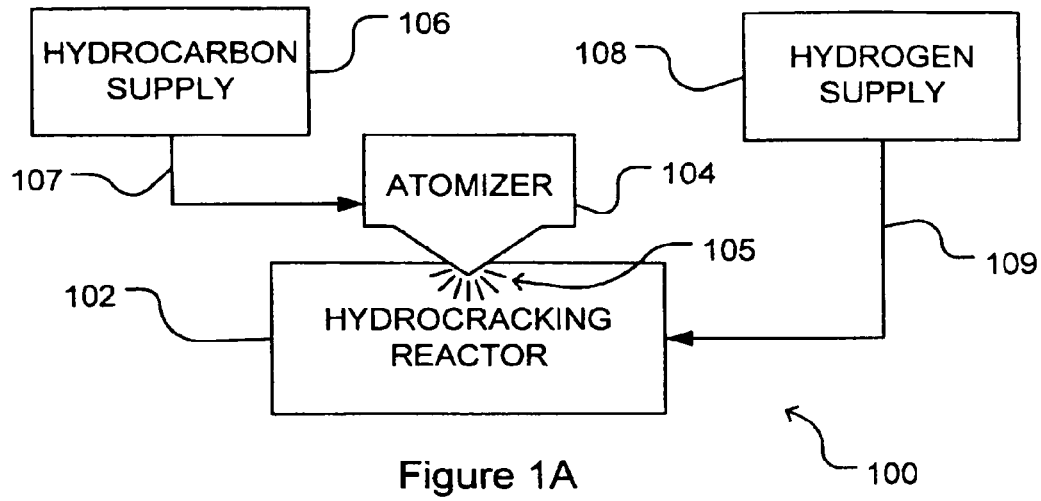
FIG. 1A schematically illustrates a system for introducing hydrocarbons into a hydrocracking reactor according to one embodiment of the invention.

FIG. 1A shows a system 100 for introducing hydrocarbons into a hydrocracking reactor 102 according to one embodiment of the invention. System 100 comprises an atomizer 104 having a nozzle 105 in fluid communication with reactor 102. Atomizer 104 receives hydrocarbons from a hydrocarbon supply 106 through a hydrocarbon conduit 107. The hydrocarbons are atomized by nozzle 105 of atomizer 104 as they are introduced to reactor 102. Within reactor 102, the atomized hydrocarbons react with hydrogen provided to reactor 102 from a hydrogen supply 108 through a hydrogen conduit 109. Atomization of the hydrocarbons provides increased surface area for reactions with hydrogen to occur. One or more catalysts (not shown) are also provided in reactor 102 to facilitate the reaction of the hydrocarbons with hydrogen.

Figure 1B:
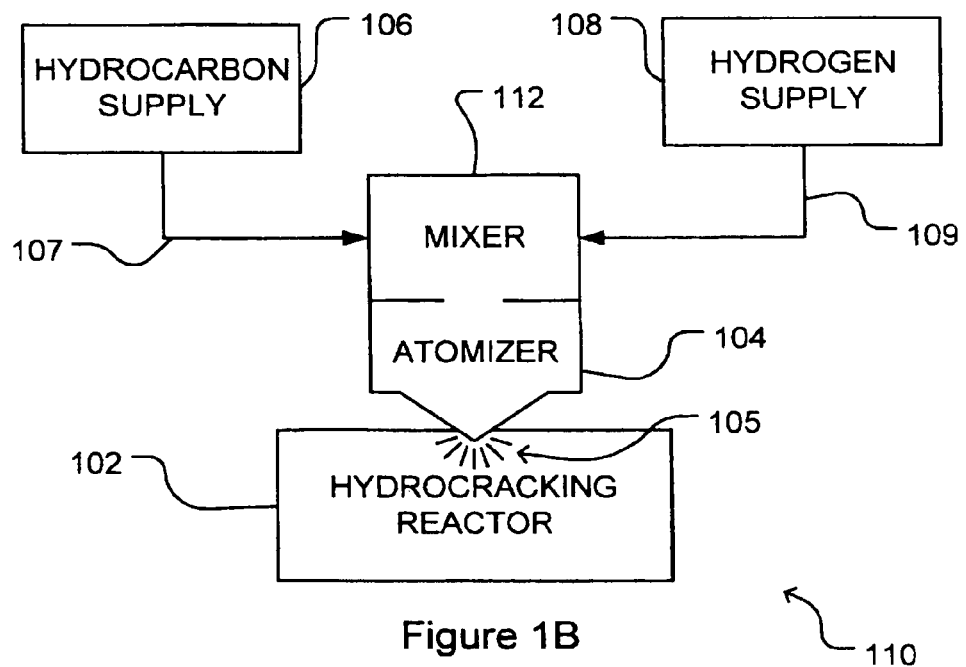
FIG. 1B schematically illustrates a system for introducing hydrocarbons into a hydrocracking reactor according to another embodiment of the invention.

FIG. 1B shows a system 110 for introducing hydrocarbons into reactor 102 according to another embodiment of the invention. System 110 is similar to system 100 of FIG. 1A, except that system 110 comprises a mixer 112 in fluid communication with atomizer 104. Mixer 112 receives hydrocarbons from hydrocarbon supply 106 through hydrocarbon conduit 107. Mixer 112 also receives hydrogen from hydrogen supply 108 through hydrogen conduit 109. The hydrocarbons and hydrogen are mixed together in mixer 112 prior to being passed to atomizer 104 for atomization and injection into reactor 102. Mixer 112 may comprise one or more swirl devices to facilitate thorough mixing of the hydrocarbons and hydrogen, as described below. Optionally, additional hydrogen may be supplied directly into reactor 102.

Figure 1C:
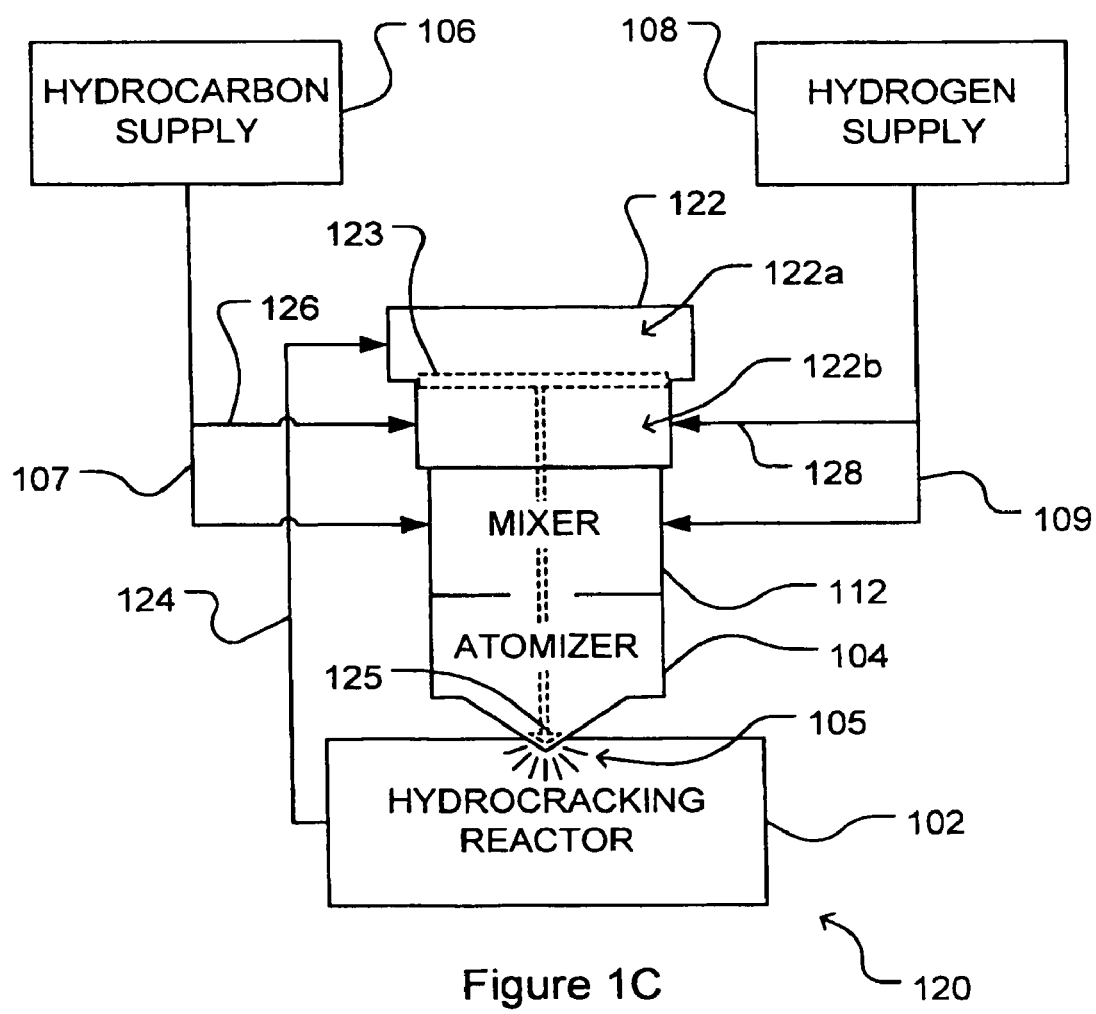
FIG. 1C schematically illustrates a system for introducing hydrocarbons into a hydrocracking reactor according to another embodiment of the invention.

FIG. 1C shows a system 120 for introducing hydrocarbons into reactor 102 according to another embodiment of the invention. System 120 is similar to system 110 of FIG. 1B, except that system 120 comprises a pressure regulator 122. Pressure regulator 122 regulates the pressure within reactor 102 by adjusting the rate of injection of hydrocarbons and hydrogen into reactor 102. In the illustrated embodiment, regulation is achieved by opening and closing nozzle 105 of atomizer 104. The rate of injection of hydrocarbons and hydrogen into reactor 102 may be adjusted by varying the degree of opening of nozzle 105. It is to be understood that pressure regulator 122 could also be used in a system without a mixer such as system 100 of FIG. 1A.

A first portion 122a of pressure regulator 122 is provided with a pressure corresponding to the pressure in reactor 102. This may be accomplished, for example by providing a portion the reaction product from reactor 102 to first portion 122a through product pressure line 124. A second portion 122b of pressure regulator 122 is provided with hydrocarbons and hydrogen from hydrocarbon supply 106 and hydrogen supply 108 through hydrocarbon pressure line 126 and hydrogen pressure line 128, respectively. Second portion 122b may comprise two separate chambers (not shown in FIG. 1C) for receiving the hydrocarbons and the hydrogen. A piston 123 is positioned between first portion 122a and second portion 122b of pressure regulator 122. Piston 123 is coupled to a valve 125 configured to open and close nozzle 105. Increased pressure in reactor 104 is passed to first portion 122a of pressure regulator 122, thereby increasing the force on a first side of piston 123 and urging valve 125 toward a closed position. Increased pressure in either hydrocarbon supply 106 or hydrogen supply 108 is passed to second portion 122b of pressure regulator 122, thereby increasing the force on a second side of piston 123 and urging valve 125 toward an open position.

FIGS. 2 to 7 illustrate an injection valve 1 for introducing fluids into a hydrocracking reactor 2 according to one embodiment of the invention. Injection valve 1 includes a number of specific details which have been included for illustrative purposes. It is to be understood that other embodiments of the invention may not have all of such details and may lack other features of the embodiment shown in FIGS. 2 to 7, or may have functionally equivalent features. Further, individual components or groups of components of injection valve 1 may be used in combination with other apparatus.

Figure 2:
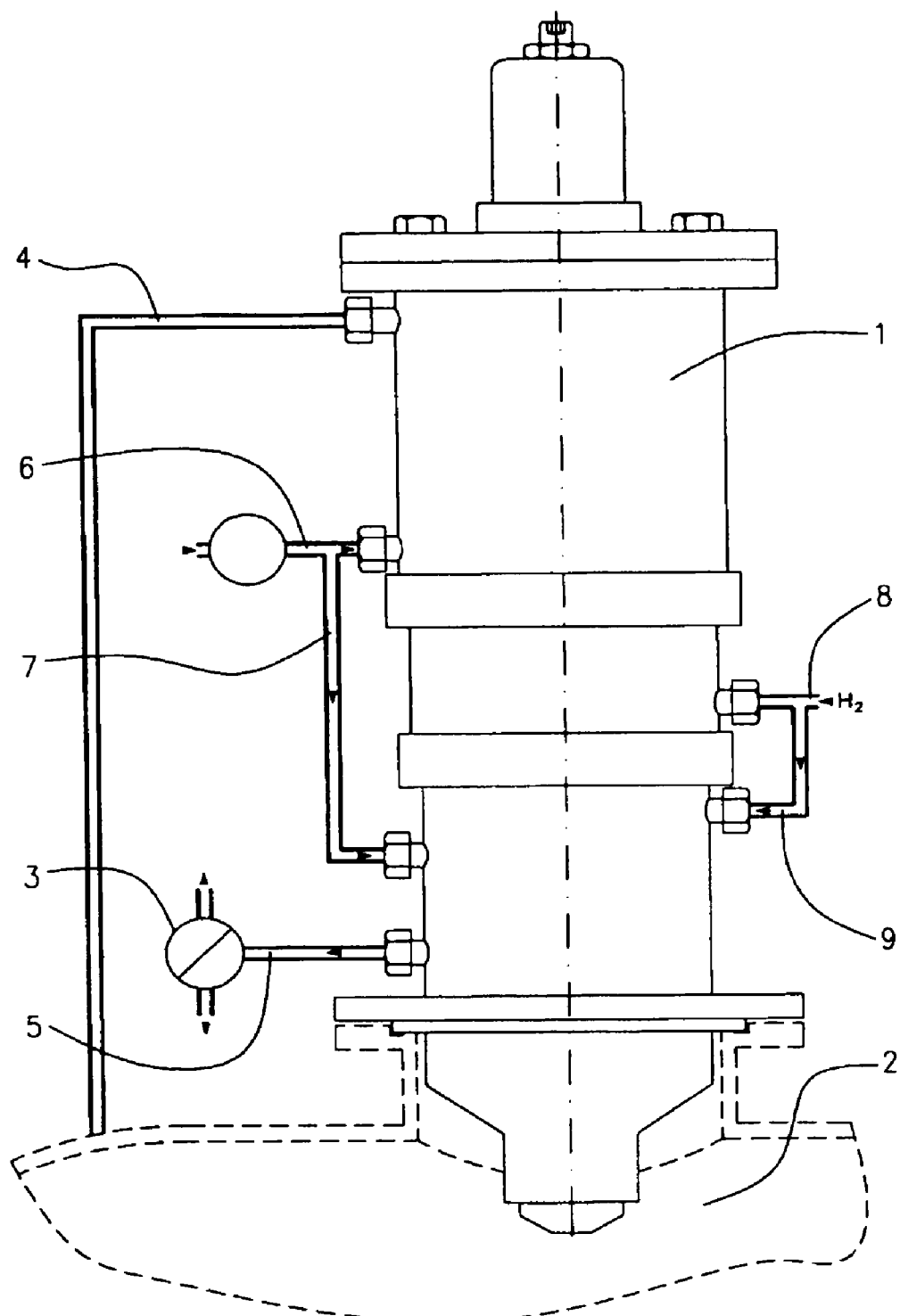
FIG. 2 shows an injection valve coupled to a hydrocracking reactor according to an example embodiment of the invention.

FIG. 2 shows an injection valve 1 coupled to a reactor 2. Hydrocarbons such as heavy oil are supplied to injection valve 1 by means of conduits 6 and 7. Hydrogen is supplied to injection valve 1 by means of conduits 8 and 9. Injection valve 1 introduces a mixture of hydrogen and oil to reactor 2 by atomization, as described further below. In reactor 2, the oil reacts with the hydrogen in the presence of a catalyst to produce lighter hydrocarbon reaction products. A portion of the reaction products produced in reactor 2 is supplied to injection valve 1 by means of conduit 4 for regulating the pressure in injection valve 1 and reactor 2.

A gas-liquid separator 3 is coupled to injection valve 1 by means of conduit 5. If the mixture of hydrogen and oil which is to be atomized by injection valve 1 contains an excess of either hydrogen or oil, the mixture is diverted to conduit 5 and provided to gas-liquid separator 3, as described further below.

Figure 3:
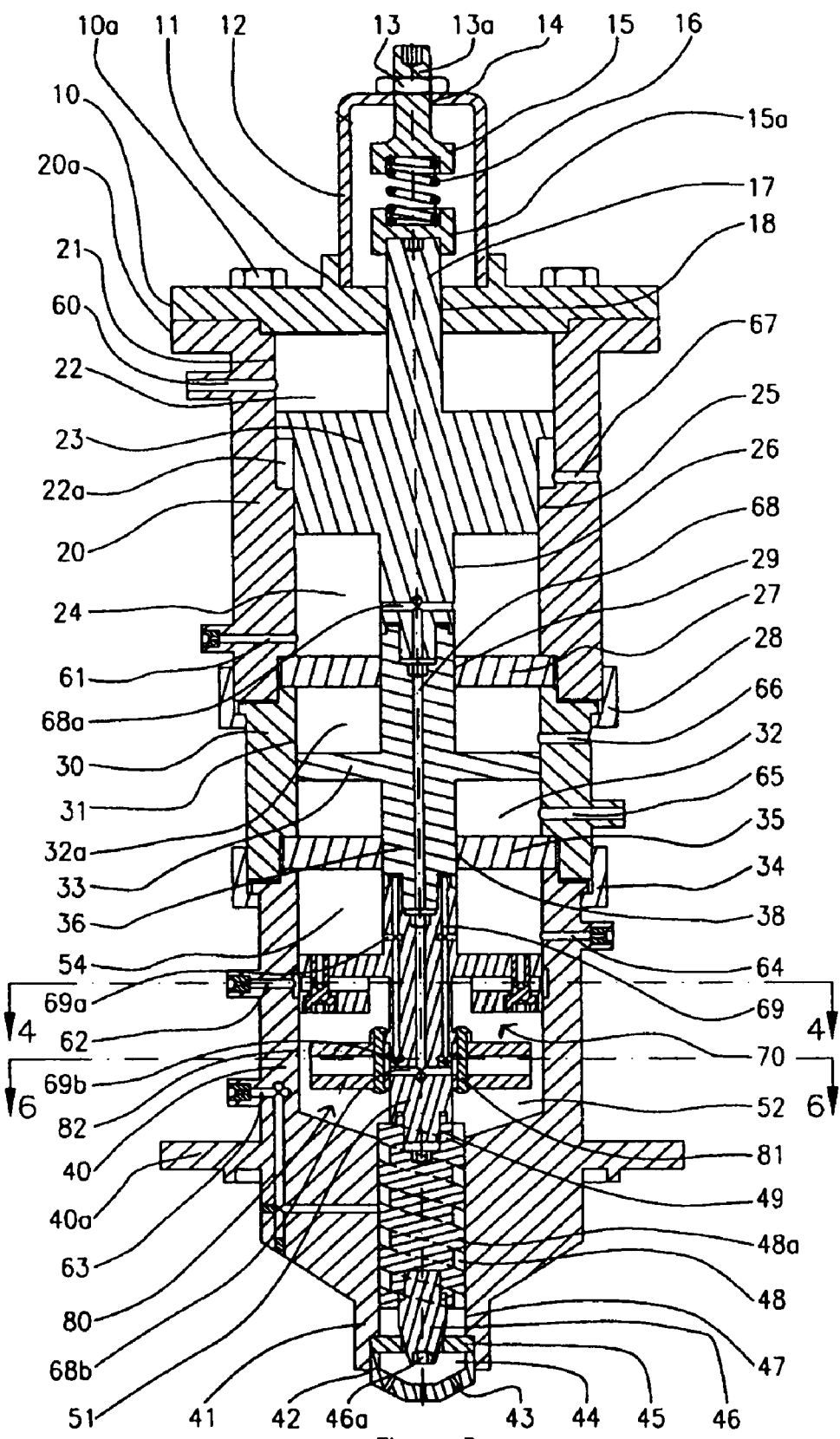
FIG. 3 is a cross-sectional view of the example injection valve of FIG. 2.

FIG. 3 is a sectional view of injection valve 1. Injection valve 1 comprises an upper body segment 20, an intermediate body segment 30 and a lower body segment 40, all of which may be generally cylindrically shaped. In the following description and claims, the term "up" (and derivatives thereof) is used to refer to the direction away from reactor 2, the term "down" (and derivatives thereof) is used to refer to the direction toward reactor 2. Upper body segment 20 may be attached to intermediate body segment 30 by a ring member 28. Ring member 28 is configured to threadably engage upper segment 20 and hold intermediate body segment 30 thereagainst. Ring member 28 may comprise two flat surfaces on its outer circumference for accommodating a suitably sized wrench. Likewise, intermediate body segment 30 may be attached to lower body segment 40 by a ring member 34. Alternatively, body segments 20, 30 and 40 could be of unitary construction. Lower body segment 40 comprises a flange 40a on a lower portion thereof. Flange 40a is engageable with a compatible mounting on reactor 2 (see FIG. 2).

A flange 20a extends radially outwards at an upper portion of segment 20. A lid 10 may be attached to flange 20a by a plurality of bolts 10a. An aperture 18 is defined in the center of lid 10. Aperture 18 is sized to accommodate a rod member 17. A tight seal between rod member 17 and aperture 18 may be achieved through highly polished surfaces and/or a seal ring designed to withstand high temperature and high pressure conditions.

A spring 16 abuts a spring-seating member 15a which rests on the upper end of rod 17. Disposed above spring 16 is a spring abutment member 15 which may comprise a threaded portion at an upper end thereof. A casing 12 may be threadably attached to a shoulder 11 atop lid 10. A threaded aperture 14 is defined in casing 12 and sized to accommodate the upper portion of spring abutment member 15. A nut 13 abuts the top of casing 12 and threadably engages the upper portion of spring abutment member 15. A shaped (e.g. hexagonal) recess 13a in the upper end of spring abutment member 15 may be used in conjunction with nut 13 for adjusting tension of spring 16 by turning spring abutment member 15 in threaded aperture 14. The lower portion of abutment member 15 may be enlarged to prevent abutment member 15 from being inadvertently removed whilst spring tension is being adjusted.

A relatively large bore 21 is provided in upper body segment 20 forming a cylindrical chamber 22 that is enclosed by lid 10 and an upper portion of a piston member 23. Chamber 22 is in fluid communication with a passage 60 drilled in upper body segment 20. Gas supplied from reactor 2 through conduit 4 and passage 60 operates in conjunction with spring member 16 and applies a force directed downward upon piston member 23. Piston member 23 may be affixed to a rod member 17 which extends upwardly therefrom and abuts spring-seating member 15a. Piston member 23 may also be affixed to a rod member 26 which extends downwardly therefrom. Alternatively, piston member 23 and rod members 17 and 26 could be of unitary construction.

As discussed further below, piston member 23 is operatively coupled to a valve comprising a valve closure member 46 and a seat 45 by means of rod members 26, 36, 51 and 49. Piston member 23 works in conjunction with the valve and another piston member 33 to provide a pressure regulation function in injection valve 1. Piston member 23 is slidable in such manner that the application of pressure by a fluid on its upper exposed surface applies a force on valve closure member 46 urging it towards seat 45. Conversely, pressure applied on the lower exposed surface of piston member 23 urges valve closure member 46 away from seat 45.

A smaller-diameter bore 25 disposed below bore 21 accommodates the lower portion of piston member 23. The diameter of bore 21 may be greater than the diameter of bore 25 preferably by an amount on the order of 1.4 times, although it is to be understood that a different ratio of the diameters of bores 21 and 25 is possible. Piston member 23 comprises a larger diameter upper portion that generally matches the diameter of bore 21 and a reduced diameter lower portion that matches the diameter of bore 25. Sealing between piston member 23 and bores 21 and 25 may be provided through highly polished surfaces and/or seal ring members designed to contain fluids at high pressure and temperature. It is to be understood that other suitable arrangements may be used to provide sealing between piston 23 and bores 21 and 25. An annular space 22a is defined between piston member 23 and upper body segment 20. Annular space 22a is in fluid communication with a passage 67, which may be provided in upper body segment 20 in order to vent annular space 22a to the atmosphere to allow unhindered movement of piston member 23.

A circular plate 27 is disposed below piston member 23 near the lower end of upper body segment 20. Circular plate 27 is of substantial construction to withstand high-pressure conditions. A circular aperture 29 in the center of circular plate 27 slidingly accommodates rod member 36, which is attached to the bottom of rod member 26. Sealing between rod member 36 and aperture 29 may be provided through highly polished surfaces and/or seal ring members designed to contain fluids at high pressure and temperature, but it is to be understood that other suitable arrangements may be used to provide sealing between rod member 36 and aperture 29. The lower end of rod member 26 is reduced in diameter and engages rod member 36 through a threaded connection. A recess in the inner wall of upper body segment 20 accommodates circular plate 27 and ensures that circular plate 27 is concentrically disposed with respect to rod members 26 and 36.

A chamber 24 is defined within bore 25 of upper body segment 20 between piston member 23 and circular plate 27. A passage 61 provided in upper body segment 20 connects chamber 24 to conduit 6 (see FIG. 2) which supplies heavy oil to chamber 24. Pressure exerted by the heavy oil in chamber 24 exerts an upward force on piston member 23, which in turn urges valve closure member 46 away from seat 45. Chamber 24 is also in fluid communication with a plurality of radial passages 68a positioned around circumference of rod member 26. Radial passages 68a are perpendicular to rod member 26 and provide fluid communication between chamber 24 and a swirl device 70 through a central passage 68 extending along rod members 26, 36 and 51 and radial passages 68b in rod member 51.

A piston member 33 is attached to rod member 36, for example by suitable welds. Piston member 33 is in sliding contact with a bore 31 in intermediate body segment 30. Bore 31 may have the same diameter as bore 25. Similarly to piston member 23, sealing between bore 31 and piston member 33 may be provided through highly polished surfaces and/or seal ring members designed to contain fluids at high pressure and temperature, but it is to be understood that other suitable arrangements may be used to provide sealing between piston member 33 and bore 31.

A vent chamber 32a is defined in bore 31 of intermediate body segment 30 between circular plate 27 and piston member 33. A passage 66 provides fluid communication between vent chamber 32a and the atmosphere and facilitates motion of piston member 33.

A circular plate 35 is disposed below piston member 33 near the lower end of intermediate body segment 30. Circular plate 35 is of substantial construction to withstand high-pressure conditions. A circular aperture 38 in the center of circular plate 35 slidingly accommodates rod member 36. Sealing between rod member 36 and aperture 38 may be provided through highly polished surfaces and/or seal ring members designed to contain fluids at high pressure and temperature, but it is to be understood that other suitable arrangements may be used to provide sealing between rod member 36 and aperture 38. A recess in the inner wall of intermediate body segment 30 accommodates circular plate 35 and ensures that circular plate 35 is concentrically disposed with respect to rod member 36.

A chamber 32 is defined in bore 31 of intermediate body segment 30 between piston member 33 and circular plate 35. A passage 65 bored in intermediate body segment 30 connects chamber 32 to conduit 8 (see FIG. 2) which supplies hydrogen to chamber 32. Pressure exerted by the hydrogen in chamber 32 exerts an upward force on piston member 33, which in turn urges valve closure member 46 away from seat 45.

The lower end of rod member 36 is reduced in diameter and engages rod member 51 through a threaded connection. A peripheral swirl device 70 and a central swirl device 80 are disposed on rod member 51. Swirl devices 70 and 80 act as mixers to mix heavy oil and hydrogen, as described further below. It is to be understood that either of swirl devices 70 or 80 could be used on its own to mix heavy oil and hydrogen, or other means could be provided to mix heavy oil and hydrogen in addition to or instead of one or both of swirl devices 70 and 80. It is also to be understood that one or both of swirl devices 70 and 80 could be used to mix fluids in conjunction with other apparatus.

A chamber 54 is defined in a bore 82 of lower body segment 40 between circular plate 35 and peripheral swirl device 70. Bore 82 may have the same diameter as bores 25 and 31 in upper body segment 20 and intermediate body segment 30, respectively. A passage 64 in lower body segment 40 connects chamber 54 with conduit 9 (see FIG. 2), which supplies hydrogen to chamber 54. Chamber 54 is in fluid communication with peripheral swirl device 70 by means of longitudinal passages 72 and radial passages 71 provided in screws 73 (see FIGS. 4 and 5). Chamber 54 is also in fluid communication with central swirl device 80 by means of a plurality of radial passages 69a and 69b and longitudinal passages 69 provided in rod member 51.

Figure 4:
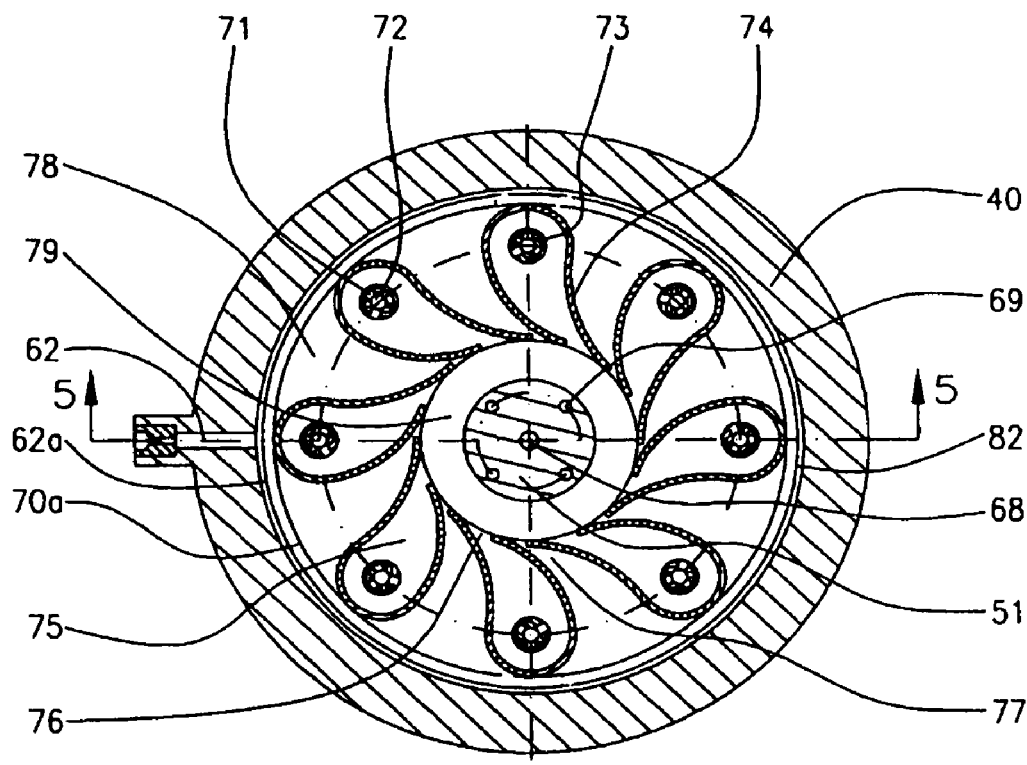
FIG. 4 is a cross-sectional view of a peripheral swirl device taken along line 4-4 of FIG. 3.
Figure 5:
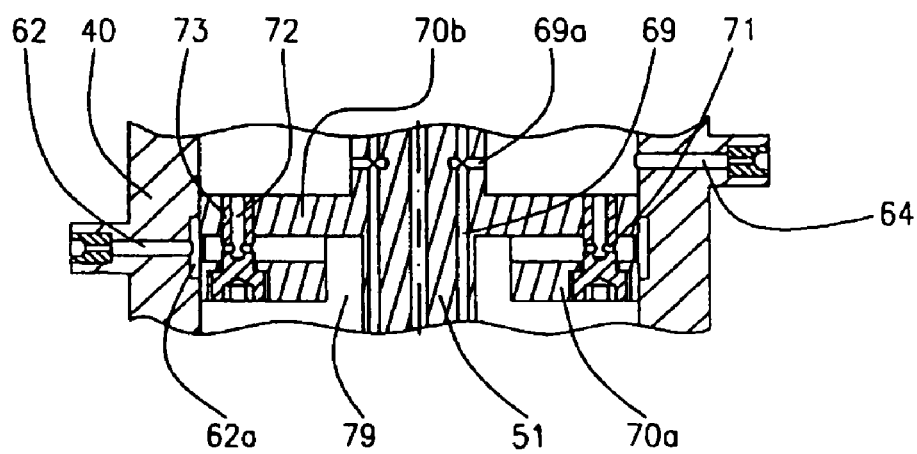
FIG. 5 is an enlarged cross-sectional view taken along line 5-5 of FIG. 4.

With reference to FIGS. 4 and 5, peripheral swirl device 70 comprises a lower plate 70a and an upper plate 70b. Lower plate 70a has an aperture 79 defined in the center thereof which forms an inner annular space. Distribution plates 74 are positioned between lower and upper plates 70a and 70b and shaped to form curved chambers 75. As shown in FIG. 4, chambers 75 may be roughly teardrop-shaped. Screws 73 extend through lower and upper plates 70a and 70b. Radial passages 71 and longitudinal passages 72 in screws 73 provide fluid communication between chambers 75 and chamber 54, so that hydrogen may be introduced into chambers 75. Radial passages 71 and longitudinal passages 72 in screws 73 may be calibrated in order to adjust the amount of fluid supplied to peripheral swirl device 70 in relation to the amount of fluid supplied to central swirl device 80. The flow rate of hydrogen to peripheral swirl device 70 may be altered by utilizing screws 73 having various passage diameters. The optimal size of passages 71 and 72 may be established in relation to various types of heavy oil during the operation of reactor 2. Nozzles 76 are formed by distribution plates 74 at the inner ends of chambers 75, such that hydrogen is expelled from nozzles 76 into aperture 79 in a generally tangential direction.

In addition to receiving hydrogen from chamber 54, peripheral swirl device 70 also receives oil from conduit 7 through a passage 62 provided in lower body segment 40. Oil from passage 62 is provided to spaces 78 defined between distribution plates 74 and lower and upper plates 70a and 70b through an annular groove 62a. The sizes of annular groove 62a and lower and upper plates 70a and 70b are selected such that spaces 78 remain in fluid communication with passage 62 throughout the entire range of motion of peripheral swirl device 70 (which may be caused by unbalanced forces on piston members 23 and 33). Nozzles 77 are formed by distribution plates 74 at the inner ends of spaces 78, such that oil is expelled from nozzles 77 into aperture 79 in a generally tangential direction. Due to the fact that each nozzle 77 is located between two nozzles 76, the fluids emerging from nozzles 76 and 77 mix intimately. The shapes of nozzles 76 and 77 and the flow rates of hydrogen and hydrocarbons may be selected to provide turbulent mixing near nozzles 76 and 77.

Figure 6:
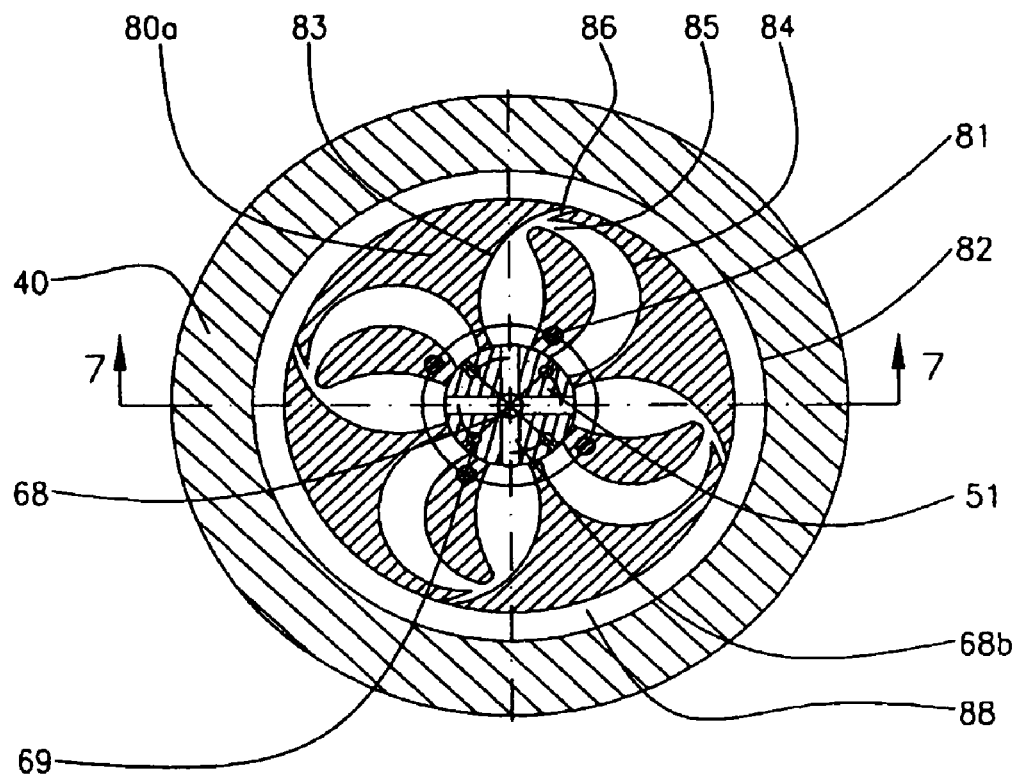
FIG. 6 is a cross-sectional view of a central swirl device taken along line 6-6 of FIG. 3.
Figure 7:
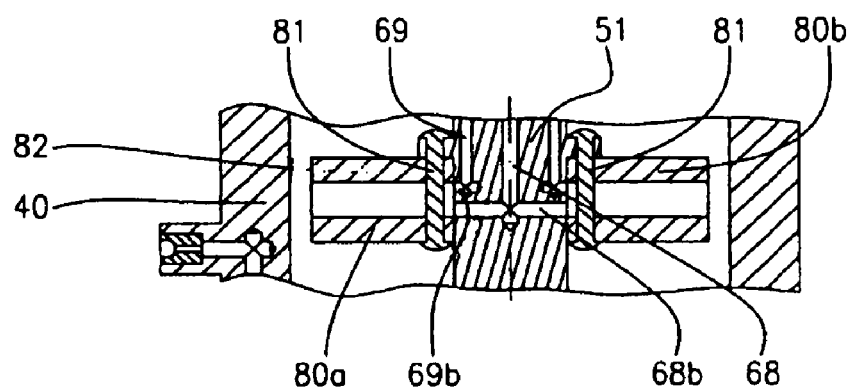
FIG. 7 is an enlarged cross-sectional view taken along line 7-7 of FIG. 6.

With reference to FIGS. 6 and 7, central swirl device 80 comprises a lower plate 80a and an upper plate 80b affixed to rod member 51 by rivets 81 or other suitable means. Rivets 81 also hold lower and upper plates 80a and 80b against each other. A plurality of hydrocarbon chambers 83 and hydrogen chambers 84 may be provided in the upper surface of lower plate 80a and/or the lower surface of upper plate 80b. In the illustrated embodiment, central swirl device 80 comprises four each of hydrocarbon chambers 83 and hydrogen chambers 84, but it is to be understood that a different number of chambers could be provided.

Hydrocarbon chambers 83 are in fluid communication with chamber 24 by means of radial bores 68b in rod member 51, longitudinal bore 68 in rod members 51, 36, and 26, and radial bores 68a in rod member 26. Each hydrocarbon chamber 83 has a narrow section in an outward portion thereof which forms a nozzle 86 in fluid communication with annular space 88. Hydrocarbons from chamber 24 flow into hydrocarbon chambers 83 and is directed radially outwardly toward nozzles 86. The walls of hydrocarbon chamber 83 are curved to impart a swirling motion to the fluid exiting through nozzle 86.

Hydrogen chambers 84 are in fluid communication with chamber 54 by means of radial passages 69a and 69b and longitudinal passage 69 in rod member 51. Each hydrogen chamber 84 has a narrow section in an outward portion thereof which forms a nozzle 85 which merges with one of nozzles 86. Hydrogen from chamber 54 flows through each hydrogen chamber 84 toward nozzle 85 which accelerates and directs the hydrogen against the stream of hydrocarbons flowing through the corresponding nozzle 86. The collision of the hydrogen and hydrocarbons at high velocity forms vortices that intimately mix the fluids. The resulting stream is expelled with a swirling motion into annular space 88 by nozzles 86.

Returning to FIG. 3, the lower portion of lower body segment 40 defines a bore 47 of reduced diameter that in sliding contact with a rod member 49. Rod member 49 is attached to the bottom of rod member 51. Valve closure member 46 is attached to the bottom of rod member 49. The diameter of bore 47 in relation to that of rod member 49 is such that bore 47 guides the sliding movement of valve closure member 46 and centers it concentrically with seat 45.

A chamber 52 is defined at the lower portion of bore 82. Fluid emerging from peripheral swirl device 70 descends in a swirling motion along rod member 51 and through annular space 88 around central swirl device 80 where it interacts with fluid emerging from central swirl device 80. The resulting stream of fluid mixture exits the lower portion of chamber 52 through a helical channel 48 machined in rod member 49. The stream of fluid mixture flows downwards though helical channel 48 which further assists the mixing process through vortices formed along upper sharp edges of helical channel 48. Helical channel 48 also creates a quiet zone which contributes to a laminar flow in the region of valve closure member 46 for facilitating the controlling action of valve closure member 46. Helical channel 48 in rod member 49 conveys the fluid mixture from the lower portion of chamber 52 to a cavity above valve seat 45.

Valve closure member 46 is preferably frusto-conically shaped and comprises a shaped (e.g. hexagonal) recess 46a in the lower region thereof. The upper portion of valve closure member 46 is affixed to rod member 49 preferably through a threaded connection. Recess 46a in valve closure member 46 may be utilized for screwing valve closure member 46 into rod member 49. Valve closure member 46 is biased into engagement with seat 45 by spring member 16 when no upward force is applied to piston member 23 or piston member 33. Valve closure member 46 regulates the flow of fluid mixture emerging from helical channel 48 to nozzle 42 in accordance with the force applied to piston member 23 and piston member 33.

Nozzle 42 is engageable with the lower portion of lower body segment 40 preferably through a threaded connection. Nozzle 42 defines a cavity 44 in fluid communication with a plurality of atomizing orifices 43 which are preferably equally spaced about the longitudinal axis of injection valve 1. Fluid mixture entering nozzle 42 from helical channel 48 is atomized by passing through atomizing orifices 43 and injected into reactor 2. Atomizing orifices 43 may be inclined, for example at an angle between 5 and 30 degrees to the longitudinal axis of injection valve 1. The number of atomizing orifices 43 may vary, for example between 4 and 12, but it will be recognized by those skilled in the art that the number, size and orientation of atomizing orifices 43 may depend on the characteristics (e.g. viscosity, pressure, etc.) of the fluid mixture to be atomized.

As the spray of fluid mixture from atomizing orifices 43 advances in reactor 2, hydrocarbons further disintegrate into smaller droplets that interact with the surrounding hot hydrogen gas. Lighter fractions start to vaporize when they reach their boiling points. In general, the rate of vaporization depends on the droplet size, boiling point of the hydrocarbon fractions and the temperature of the gas. Due to the small droplet size generated by injection valve 1 vaporization of lighter fractions is significantly enhanced. Hydrogen surrounding the vaporized light fractions readily interacts (in the presence of a suitable catalyst) with said fractions, which improves the hydrocracking process. Furthermore, heavier fractions remaining in a liquid phase are exposed to intense heat and action by hydrogen, resulting in a more efficient cracking of long molecular chains within the heavier fractions. The hydrocracking process in reactor 2 occurs at significantly lower pressures and temperatures when hydrocarbons and hydrogen are introduced as described herein than in some prior art arrangements. Lower pressure and temperature lead to important savings in capital and operating costs.

Injection valve 1 can be operated to respond to transitory conditions and to maintain relatively constant pressures within reactor 2. Relatively constant pressure conditions are important in obtaining a light oil product with stable hydrogen content. Pressure of the fluid mixture in reactor 2 may be regulated by providing a fluid under the same pressure as the pressure in reactor 2 to chamber 22. This may be accomplished, for example, by providing a portion of the fluid mixture in reactor 2 to chamber 22 of injection valve 1 through passage 60 and conduit 4 (see FIG. 2). As the pressure in reactor 2 increases, the downward force on piston member 23 also increases. Since the diameter of bore 21 is roughly 1.4 times the diameter of bore 25, as discussed above, pressure changes in chamber 22 have roughly two times the effect on the force applied to piston member 23 as do pressure changes in chamber 24, or pressure changes in chamber 32. Thus, an increase in pressure in reactor 2 will increase the downward force on piston member 23 and urge valve closure member 46 towards its seat 45, and a decrease in pressure in reactor 2 will decrease the downward force on piston member 23 and allow the upward force on piston members 23 and 33 to urge valve closure member 46 away from its seat 45.

In some embodiments, means may be provided to maintain a relatively constant ratio of high-density hydrocarbon liquid to hydrogen in a fluid stream provided to the reactor in the event of a problem with the hydrogen or high-density hydrocarbon supply. For example, injection valve 1 may be configured to mitigate the effects of an oversupply of oil or hydrogen to injection valve 1. In such embodiments, a passage 63 in the lower portion of lower body segment 40 may be provided to remove a portion of the fluid mixture in helical channel 48 when an excess of oil and/or hydrogen is present in the fluid mixture. Passage 63 is positioned to be in fluid communication with helical channel 48 when rod member 49 is displaced upwards by a distance that exceeds the normal stroke of valve closure member 46. Such upward displacement may occur, for example, if the pressure of hydrogen or oil supplied to chamber 32 or 24, respectively, is higher than expected, such that the upward force on piston member 33 or 23 forces valve closure member upward past a predetermined position. When passage 63 is in fluid communication with helical channel 48, a portion of the fluid mixture is then diverted from helical channel 48 to passage 63, and then through conduit 5 to a gas-liquid separator 3 (see FIG. 2).

In gas-liquid separator 3 gas fractions of the fluid mixture may be separated from liquid fractions of the fluid mixture. The separation may be gravitational. Excessive amounts of gas cause an increase of pressure in gas-liquid separator 3 which may be detected through a pressure switch (not shown). Gas may then be recycled by means of a valve (not shown) controlled by the pressure switch. Excessive amounts of liquid result in a higher liquid level in gas-liquid separator 3. A level switch (not shown) may be utilized to detect the rise of liquid level and open a valve (not shown) to re-circulate the liquid.

Figure 8:
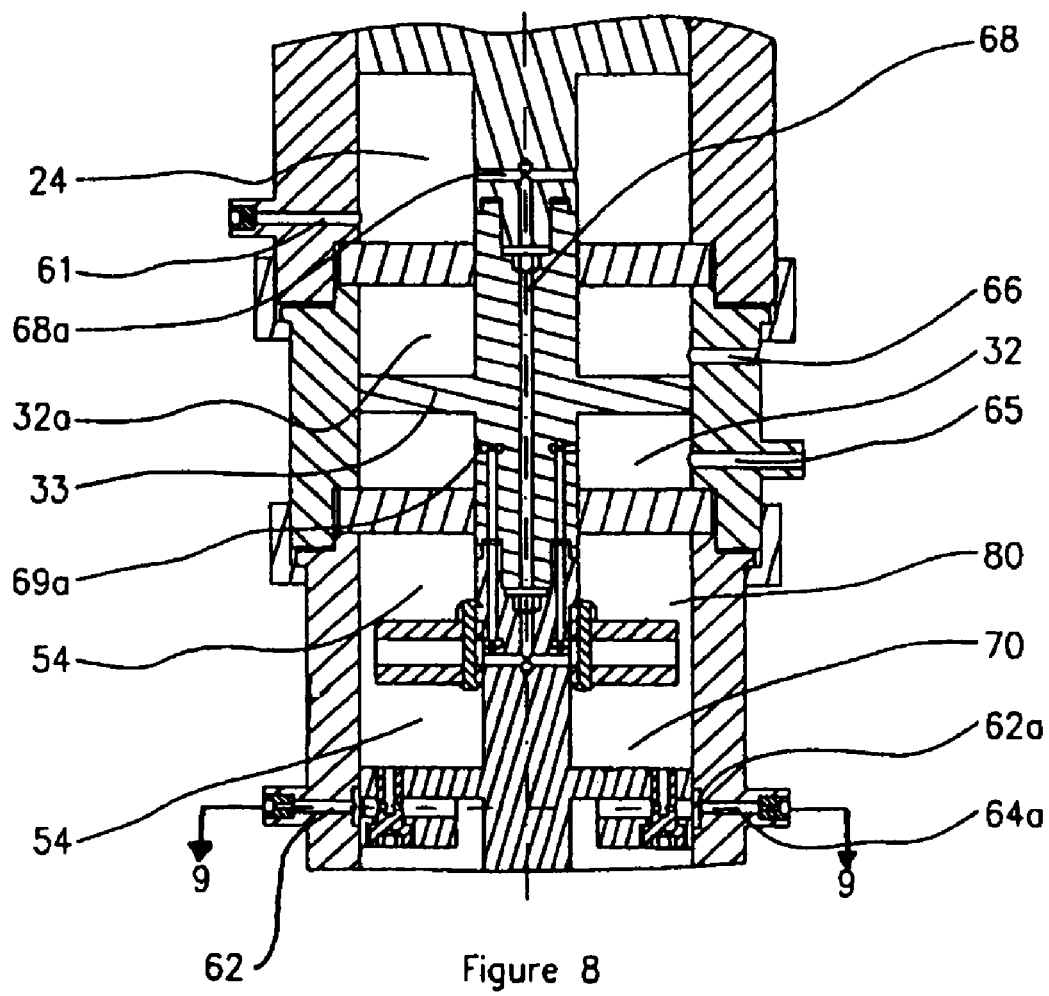
FIG. 8 is a cross-sectional view of a portion of an injection valve according to another embodiment of the invention; and, FIG. 9 is a cross-sectional view of a peripheral swirl device taken along line 9-9 of FIG. 8.

FIG. 8 shows a portion of an injection valve according to another embodiment of the invention. The injection valve of the FIG. 8 embodiment is similar to injection valve 1 of FIG. 3, except that peripheral swirl device 70 is positioned downstream of central swirl device 80 in the FIG. 8 embodiment, and passage 64a is provided in lower body segment 40 instead of passage 64. Central swirl device 80 operates in the same way in the FIG. 8 embodiment as it does in the FIG. 3 embodiment, except that hydrogen chambers 84 are in fluid communication with chamber 32 in the FIG. 8 embodiment instead of chamber 54. The mixture of hydrocarbons and hydrogen produced by central swirl device 80 flows outwardly through annular space 88 into chamber 54 and then downwardly toward peripheral swirl device 70.

Peripheral swirl device 70 has the same construction in the FIG. 8 embodiment as it does in the FIG. 3 embodiment. However, in the FIG. 8 embodiment, fluids are provided to peripheral swirl device 70 in a different manner. The mixture of hydrocarbons and hydrogen from central swirl device 80 in chamber 54 is provided to chambers 75 of peripheral swirl device 70 through bores 71 and 72 in screws 73. The mixture is then expelled from nozzles 76 into aperture 79.

Figure 9:
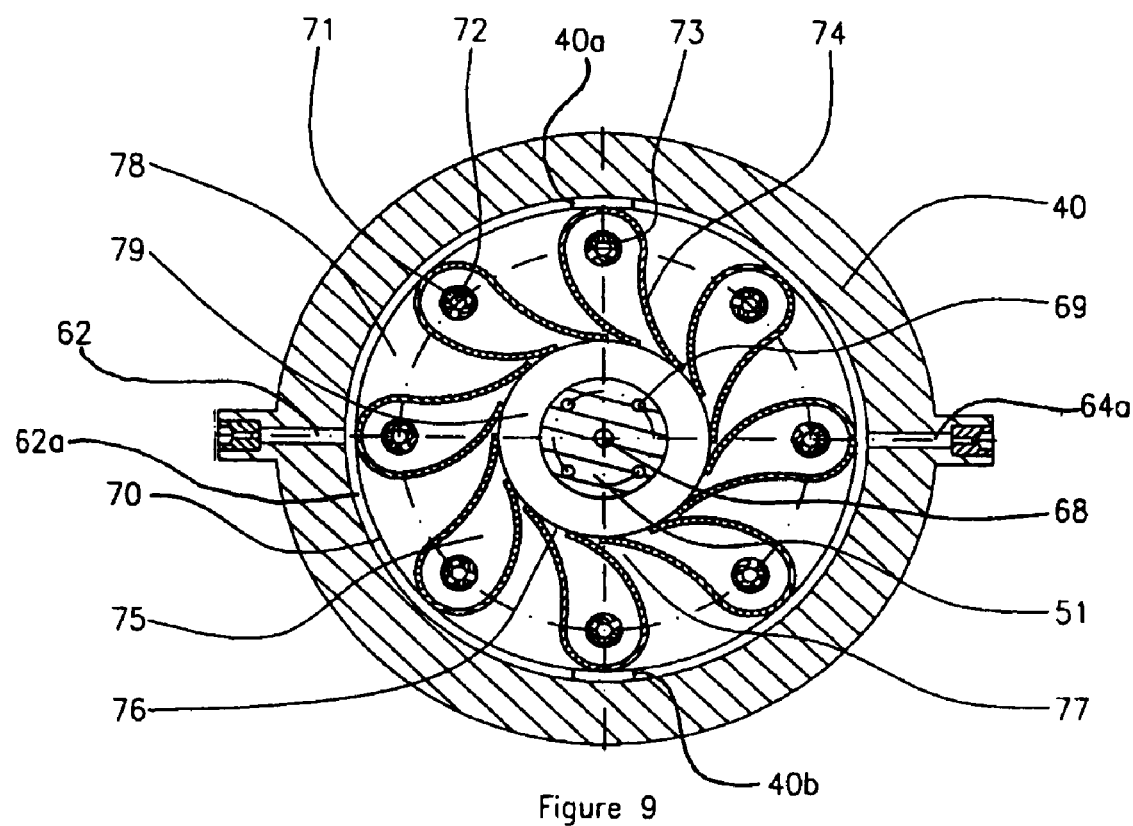

As best seen in FIG. 9, annular groove 62a is not machined around the entire inner surface of bore 82 in order to form two shoulders 40a and 40b. Shoulders 40a and 40b abut two different plates 74, and are preferably disposed symmetrically with respect to the longitudinal axis of the injection valve such that annular groove 62a is divided into two equal portions. Hydrocarbons are provided to some of spaces 78 through passage 62 and one portion of annular groove 62a. Hydrogen is provided to the remaining spaces 78 through passage 64a and the other portion of annular groove 62a. The hydrocarbons and hydrogen in spaces 78 are expelled through nozzles 77 into aperture 79, where they are mixed with the mixture being expelled from nozzles 76. The resulting mixture then descends towards helical channel 48 as described above.

While a number of exemplary aspects and embodiments have been discussed above, those of skill in the art will recognize certain modifications, permutations, additions and sub-combinations thereof. For example, a swirl device having a different construction than the specific examples described above may be provided which introduces a swirling motion to mix fluids. It is therefore intended that the following appended claims and claims hereafter introduced are interpreted to include all such modifications, permutations, additions and sub-combinations as are within their true spirit and scope.

What is claimed is:

1. A method for introducing a high-density hydrocarbon liquid into a hydrocracking reactor, the method comprising:
   atomizing the high-density hydrocarbon liquid; and,
   injecting the atomized liquid into the hydrocracking reactor,
   mixing hydrogen with the high-density hydrocarbon liquid to prior to atomizing the high-density hydrocarbon liquid wherein mixing hydrogen with the high-density hydrocarbon liquid comprises providing a swirl device and providing the hydrogen and high-density hydrocarbon into the swirl device causing each of the hydrogen and high-density hydrocarbon to undergo a swirling motion prior to mixing the hydrogen and high-density hydrocarbon.

2. A method according to claim 1 further comprising:
   regulating a pressure in the hydrocracking reactor by controlling a rate at which the high-density hydrocarbon liquid is injected into the hydrocracking reactor.

3. A method according to claim 2 wherein regulating the pressure in the hydrocracking reactor comprises:
   providing a piston coupled to a valve configured to control the rate at which the high-density hydrocarbon liquid is injected into the hydrocracking reactor; and,
   delivering a portion of a fluid mixture in the hydrocracking reactor to a chamber adjacent to the piston such that an increase in the pressure of the fluid mixture produces a force on the piston which causes the valve to reduce the rate at which the high-density hydrocarbon liquid is introduced into the hydrocracking reactor.

4. A method according to claim 1 further comprising a step for maintaining a relatively constant ratio of high-density hydrocarbon liquid to hydrogen in a fluid stream provided to the reactor in the event of a problem with a supply of high-density hydrocarbon liquid or hydrogen.

* * * * *